Dec. 17, 1929.    M. J. AUGUST    1,740,056
AUXILIARY DRIVING ATTACHMENT FOR VEHICLES
Filed Nov. 9, 1926
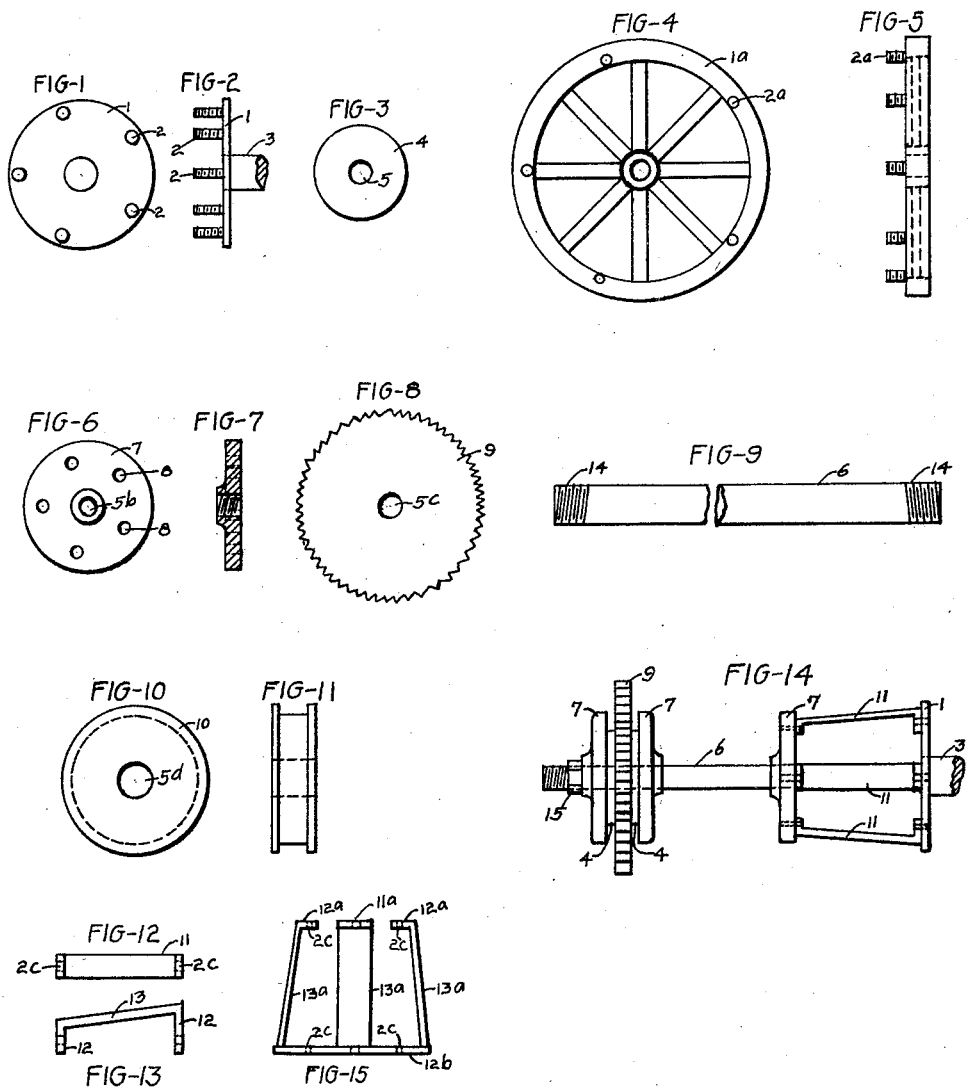
INVENTOR
Maurice J. August
BY
A D Caesar
ATTORNEY Patented Dec. 17, 1929

1,740,056

UNITED STATES PATENT OFFICE

MAURICE J. AUGUST, OF PHILADELPHIA, PENNSYLVANIA

AUXILIARY DRIVING ATTACHMENT FOR VEHICLES

Application filed November 9, 1926. Serial No. 147,277.

This invention relates to new and useful auxiliary attachments for vehicles, which attachments are designed to transmit power from the driving shaft of said vehicle to some other piece of machinery. Although the device is shown as adapted for use in connection with automobiles, it is to be understood that the applicant does not intend to limit himself to automobiles or even vehicles in general in which there is a driving shaft or a source of power but the device disclosed may be used in connection with any rotary shaft whether that be part of a vehicle or stationary engine.

Many devices of this type have been patented but they are all open to objection on some if not all of the following grounds:—

(1) The necessity of "jacking up" the car before the attachment can be used.

(2) The complexity of the device with the resultant (a) difficulty of assembly, (b) comparatively high cost of production and (c) the necessity that the user be a fairly skilled mechanic.

With the object of removing these and other objections to such devices the applicant has a device which in addition to removing the objections outlined possesses other advantages which will become apparent as the description proceeds.

In the drawings

Figure 1 is a front view of the plate which supports the disc type of wheel of an automobile.

Figure 2 is a side view of the same attached to a portion of the driving axle.

Figure 3 is a front view of the rubber washer which is used.

Figure 4 is a front view of a spoke wheel of an automobile.

Figure 5 is a side view of the same.

Figure 6 is a front view of an attaching flange.

Figure 7 is a side view of the same.

Figure 8 is a front view of a saw which is one of the many attachments which may be used in connection with the device disclosed.

Figure 9 is a side view of the supporting shaft.

Figure 10 is a front view of a pulley which may be mounted on the applicant's device, adapting the same for driving a stationary engine or other machine.

Figure 11 is a side view of the same.

Figure 12 is a top view of the auxiliary attaching device.

Figure 13 is a side view of the same.

Figure 14 is a side view of an assembly showing the applicant's device attached to the disc plate and carrying a rotary saw.

Figure 15 is a front view of a plurality of auxiliary attaching flanges made in an integral piece.

Referring more particularly to the drawings where like reference numerals refer to like parts reference numeral 1 denotes the plate which supports the disc wheel of an automobile, 2 denotes the attaching bolts used to attach the said wheel to the attaching disc, 3 denotes the driving shaft or axle of the automobile to which the disc plate is attached.

Numeral 4 denotes a rubber washer having a hole 5 therein, adapting it for being mounted on shaft 6.

Numeral 7 denotes the attaching flange or plate having a plurality of bolt holes 8 therein and a hole 5—B adapting it for mounting upon the shaft 6 or for supporting the said shaft.

Numeral 9 denotes a rotary saw having the hole 5—c adapting it for mounting upon the shaft 6.

Numeral 10 denotes a pulley having a hole 5—D therein adapting it for mounting upon the shaft 6.

Numeral 11 denotes one of the auxiliary attaching ribs or supports of which there are as many as there are bolts on the wheel or disc support. The said attaching ribs or supports are of general U shape as shown having side flanges 12 and a main flange 13. This main flange 13 is inclined when necessary as shown, the angle of inclination being determined by the relative position of the bolts on the disc support or automobile wheel and the bolt holes on the attaching flange or plate. If the plate is of greater diameter than the disc supporting plate then the slope of the part 13 would be outward instead of inward as shown.

A plurality of attaching ribs may be used as shown or the ribs could be in an integral piece, there being as many rib like extensions as there are bolts upon the wheel. Such an arrangement is shown in Figure 15 where reference numeral 11—A denotes the integral piece having the auxiliary attaching ribs 13—A, ending in the top portions 12—A and a bottom plate 12—B. Both the parts 12—A and 12—B have bolt holes 2—C at proper places adapting the entire piece to be fastened to the wheel and then adapting the piece to have attached thereto a flange 7 and the other parts of the assembly.

The portion 12—B could be annular or it could be made to serve as a flange per se.

Numeral 1—A refers to the spoke wheel of an automobile having the fastening bolts 2—A thereon.

Numeral 6 denotes the supporting shaft which may be solid or hollow as desired and which has its ends threaded as shown at 14.

Having described the component parts, the assembled device as well as the method of assembly will now be described.

To use the applicant's device in connection with an automobile the wheel, if a disc wheel, is dismounted leaving the plate 1, and if a spoke wheel the tire and associated parts are removed, leaving the part 1—A. In both cases however the parts 1 or 1—A carry the bolts 2 and 2—A respectively, these being connected to the wheel or disc support in the manner well known in the art.

The auxiliary supporting ribs 11 are now attached to the wheel or disc support by means of the bolts 2 and the holes 2—C as shown. The flange 7 is now attached to the supporting ribs as shown—bolts or other means being used.

The shaft 6 is screwed into the part 5—B in the flange 7. Upon the shaft 6 is now mounted a flange 7 which serves as a retaining wall, the rubber washer 4, then the attachment to which power is to be supplied as the saw 9 shown or the pulley 10, then another rubber washer 4, a second retaining flange 7 and this assembly is locked by means of a lock nut 15.

Power supplied to the axle 3 causing it to rotate will rotate the saw 9, pulley 10 or any other object fixedly attached to the shaft 6.

The rubber washers serve to keep the saw from slipping but this may be supplemented by the use of a slot and key therein, the latter being one of the many well known devices to lock an object upon a shaft.

It can readily be seen that the applicant's shaft may carry any number of attachments such as a saw or grindstone, and may thus directly function as a machine or it may carry a pulley and thus transfer power to another engine.

The applicant's device may be attached not only to automobile wheels but to any shaft by merely attaching a plate having bolts thereto to the shaft and then proceeding as outlined above.

It is further to be understood that the auxiliary supports and each of the component elements of the device may be made of different size and shape from that shown without departing from the spirit of my invention. For instance, the shaft 6 may be attached to the flange 7 by means of a thumb screw. The disclosure herein is therefore merely the preferred form and is shown to illustrate my device but not to limit the same.

Having described my invention, what I claim is:—

1. An attachment for use in combination with the wheel of an automobile the said attachment consisting of a plurality of U shaped supports, one of the ends of the said supports detachably connected to bolts carried by the said wheel; a plate detachably carried by the other end of all of the said supports, the said plate having a threaded aperture formed therein; a shaft threaded at its ends threadably mounted in the said threaded aperture in the said plate; flanges threadedly mounted upon the said shaft near its outer end; a rotatable member mounted upon the said shaft between the said flanges; rubber washers mounted upon the said shaft between the said rotatable member and the said flanges; and a nut mounted upon the said shaft, the said nut contacting with the flange nearest to the outer end of said shaft; the said flanges, washers and nut serving as a retaining means to lock the said rotatable member in place.

2. A power transmitting attachment for use in combination with the wheel of an automobile the said attachment consisting of a plate having a plurality of apertures and a main threaded aperture formed therein; a shaft threaded at its ends threadably mounted in the said main threaded aperture formed in the said plate; and means for detachably connecting the said plate to bolts carried by the said wheel of the said automobile, the said means consisting of a plurality of independent U shaped supports, bolts and cooperating nuts detachably connecting the said plate to the said supports, the said bolts extending through the said apertures in the said plate and cooperating apertures formed in the vertical members situated at one of the ends of the said supports, each of the vertical members at the other end of the said supports having an aperture therein, each said aperture being adapted to receive one of the said bolts on the said wheel.

In testimony whereof I affix my signature.

MAURICE J. AUGUST.